United States Patent [19]

König et al.

[11] Patent Number: 4,571,266

[45] Date of Patent: * Feb. 18, 1986

[54] PROCESS FOR SEPARATION AND PURIFICATION OF PLATINUM GROUP METALS (I)

[75] Inventors: Karl-Heinz König, Frankfurt; Michael Schuster, Frankfurt-Harheim; Gerd Schneeweis, Duren; Bernd Steinbrech, Frankfurt; Rainer Schlodder, Rodenbach, all of Fed. Rep. of Germany

[73] Assignee: Degussa Aktiengesellschaft, Frankfurt, Fed. Rep. of Germany

[*] Notice: The portion of the term of this patent subsequent to Feb. 18, 2003 has been disclaimed.

[21] Appl. No.: 667,893

[22] Filed: Nov. 2, 1984

[30] Foreign Application Priority Data

Nov. 5, 1983 [DE] Fed. Rep. of Germany ....... 3334055

[51] Int. Cl.⁴ .............................................. C22B 11/04
[52] U.S. Cl. ........................................ 75/108; 423/22; 423/42; 423/101; 423/140; 75/117; 75/118 R; 75/119; 75/120; 75/121; 210/725; 210/729; 564/23
[58] Field of Search ...... 423/22, 24, 42, 100, 423/101, 139, 140; 75/118 R, 121, 108, 119, 120, 117, 101 BE; 564/23; 210/725, 727

[56] References Cited

U.S. PATENT DOCUMENTS

| | | | |
|---|---|---|---|
| 2,342,785 | 2/1944 | Block et al. | 564/23 |
| 3,748,356 | 7/1973 | Wellinga et al. | 564/23 |
| 3,994,719 | 11/1976 | Corte et al. | 423/22 |
| 4,368,073 | 1/1983 | Breister et al. | 75/118 R |

FOREIGN PATENT DOCUMENTS 1230011 12/1966 Fed. Rep. of Germany ........ 564/23

*Primary Examiner*—John Doll
*Assistant Examiner*—Robert L. Stoll
*Attorney, Agent, or Firm*—Cushman, Darby & Cushman

[57] ABSTRACT

There is described a process for the separation and purification of the platinum group metals from base metal out of acidic aqueous solutions. For this purpose there is used a substituted thiourea of the formula

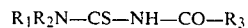

or

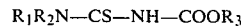

as the extraction agent. Preferably there are employed N,N-dialkyl-N'-benzoylthiourea wherein $R_1$ and $R_2$ are methyl, n-butyl, or n-hexyl.

15 Claims, No Drawings

PROCESS FOR SEPARATION AND PURIFICATION OF PLATINUM GROUP METALS (I)

RELATED APPLICATION

This application is related to a Konig et al application filed on even date and claiming the benefit of German priority application P3340056.3

BACKGROUND OF THE INVENTION

The invention is directed to a process for the separation and purification of platinum group metals from base metals and for separation of platinum group metals from each other from aqueous, acidic solutions by means of an organic extraction agent in a solvent that is non-miscible with water.

The process known at the present time for the separation and purification of the platinum group metals platinum, palladium, rhodium, ruthenium, iridium, and osmium from acidic, aqueous solutions which also contain base metals require a large number of individual process steps and are very time consuming. Besides the difficulties increase in the known process for separating platinum metals with the number of such metals and the base metals present such as copper, iron, nickel, cobalt, zinc, or manganese.

Known processes operate in part with organic precipitation and extraction agents, such as, e.g. mercaptopyridine-N-oxide (U.S. Pat. No. 4,368,073), but these reagents are frequently only slightly specific or not usable in general for all platinum group metals.

Therefore it was the problem of the present invention to provide a process for the separation and purification of platinum group metals from base metals and to separate the platinum group metals from each other from aqueous, acidic solutions by means of an organic extraction agent in a solvent which is not miscible with water, with which in a simple manner there are separated and purified as quantitatively as possible all platinum group metals.

SUMMARY OF THE INVENTION

This problem was solved according to the invention by employing as extraction agents a substituted thiourea of the general formula $$R_1R_2N-CS-NH-CO-R_3$$

or $$R_1R_2N-CS-NH-COOR_3,$$

wherein $R_1$, $R_2$, and $R_3$ are substituted or unsubstituted alkyl, aryl, or aralkyl groups, at a pH below 4 and at a temperature between 15° and 100° C.

Thus $R_1$, $R_2$, and $R_3$ can be methyl, ethyl, propyl, isopropyl, n-butyl, sec.butyl, n-amyl, n-hexyl, n-octyl, n-decyl, n-dodecyl, n-octadecyl, phenyl, tolyl, or benzyl.

Illustrative compounds include:
N,N-dimethyl-N'-acetyl thiourea
N,N-diethyl-N'-acetyl thiourea
N-methyl-N-ethyl-N'-acetyl thiourea
N,N-diethyl-N'-acetyl thiourea
N,N-dipropyl-N'-acetyl thiourea
N,N-dibutyl-N'-acetyl thiourea
N,N-dihexyl-N'-acetyl thiourea
N,N-dioctyl-N'-acetyl thiourea
N,N-dimethyl-N'-propionyl thiourea
N,N-diethyl-N'-propionyl thiourea
N,N-dibutyl-N'-propionyl thiourea
N,N-dihexyl-N'-propionyl thiourea
N,N-dimethyl-N'-butyryl thiourea
N,N-diethyl-N'-butyryl thiourea
N,N-dibutyl-N'-valeroyl thiourea
N,N-dihexyl-N'-butyryl thiourea
N,N-didecyl-N'-acetyl thiourea
N,N-dibenzyl-N'-acetyl thiourea
N,N-diphenyl-N'-acetyl thiourea
N,N-diphenyl-N'-butyryl thiourea
N,N-diphenyl-N'-benzoyl thiourea
N,N-diphenyl-N'-hexanoyl thiourea
N,N-dimethyl-N'-stearoyl thiourea
N,N-dimethyl-N'-benzoyl thiourea
N,N-diethyl-N'-benzoyl thiourea
N,N-dibutyl-N'-benzoyl thiourea
N,N-dihexyl-N'-benzoyl-thiourea
N,N-didoceyl-N'-benzoyl thiourea
N,N-dimethyl-N'-carbomethoxy thiourea
N,N-diethyl-N'-carbomethoxy thiourea
N,N-diethyl-N'-phenacetyl thiourea
N,N-dibutyl-N'-carbomethoxy thiourea
N,N-dihexyl-N'-carbomethoxy thiourea
N,N-dimethyl-N'-carboethoxy thiourea
N,N-diethyl-N'-carboethoxy thiourea
N,N-dipropyl-N'-carboethoxy thiourea
N,N-dibutul-N'-carboethoxy thiourea
N,N-dihexyl-N'-carboethoxy thiourea
N,N-dioctyl-N'-carboethoxy thiourea
N,N-didecyl-N'-carboethoxy thiourea
N,N-diphenyl-N'-carboethoxy thiourea
N,N-dimethyl-N'-carbopropoxy thiourea
N,N-diethyl-N'-carbobutoxy thiourea
N,N-diethyl-N'-carbohexoxy thiourea
N,N-dimethyl-N'-carbophenoxy thiourea
N,N-diethyl-N'-carbophenoxy thiourea Preferably there is used a thiourea in which $R_1$ and $R_2$ each is a methyl, n-butyl, or n-hexyl group and $R_3$ is a phenyl group. These N,N-dialkyl-N-benzoyl thioureas are readily prepared from the corresponding secondary amines, benzoyl chloride and potassium thiocyanate.

In using N,N-dialkyl-N'-carboalkoxy thioureas $R_3$ is preferably a methyl or ethyl group. The synthesis is carried out from the corresponding secondary amines, chloroformic acid ester and potasium thiocyanate. As solvent there can be used aliphatic or aromatic compounds, preferably xylene, chloroform, or toluene.

Preferably, the platinum group metals are extracted from hydrochloric acid solutions, in which case the extraction agent is added in stoichiometric excess. Thereby, one starts from a complex forming reaction, for example of the form $$Me^{2+} + 2DMBT \rightarrow Me(DMBT)_2 + 2H^+$$

(DMBT = N,N-dimethyl-N'-benzoyl thiourea). The extraction agent is very stable to hydrolysis and oxidation, besides it only has a very slight solubility in acidic aqueous solutions so that no extraction agent is lost in the extraction. There is obtained a quick establishment of equilibrium and high distribution coefficients.

The separated platinum group metals can be recovered from the organic phase according to known processes and also can be separated from each other.

Depending on the composition of the acid solutions by selection of the pH and the temperature there can also be separated off individual platinum group metals specifically from other members of the group. Thus, e.g. palladium forms a very stable complex with DMBT, so that it can be separated from all the rest of the noble and base metals in 3 to 6 molar hydrochloric acid solution. On the other hand, with iridium there takes place for example at a pH of 2-4 the formation of the DMBT complex only at a temperature of 80° to 100° C., while the remaining platinum group metals form the corresponding complex compounds already at below 60° C., so that iridium also can be separated from all the remaining metals quantitatively and specifically.

The following table shows the pH range in which several of the corresponding metal chelates can be extracted, applicable for the N,N-dimethyl-N'-benzoyl thiourea (DMBT) at metal concentrations of $10^{-2}$ mol/l

| Metal | pH-Range Extraction | Temperature (°C.) | |
|---|---|---|---|
| $Pt^{II}$ | 2-4 | 20 | From these values |
| $Pt^{IV}$ | 2-4 | 60 | there can be |
| $Pd^{II}$ | 6m HCL | 20 | selected the respective separation |
| $Ru^{III}$ | 2-4 | 60 | tive separation |
| $Rh^{III}$ | 2-4 | 60 | parameters for a |
| $Os^{III}$ | 2-4 | 60 | given solution |
| $Ir^{III}$ | 2-4 | 80-100 | |
| $Ag^{I}$ | 2-4 | 20 | |
| $Cu^{II}$ | 0-2 | 20 | |
| $Co^{III}$ | 6-7 | | |
| $Ni^{II}$ | 5-7 | | |
| $Zn^{II}$ | 5-7 | | |

Also, the remaining complexible base metal, as e.g. lead or cadmium are only precipitated or extracted at a pH above 4. Iron forms no extractable complex with DMBT in hydrochloric acid solution. However, in high concentrations and in the presence of other metals it is co-extractable in small amounts, but it is easily removed by washing the organic phase with 3 molar sulfuric acid. N,N-di-n-butyl and N,N-di-n-hexyl-benzoyl thiourea extract iron to a substantially greater extent but the organic phase likewise can easily freed of co-extracted iron by washing with 3 molar sulfuric acid.

Unless otherwise indicated all parts and percentages are by weight.

The process can comprise, consist essentially of, or consist of the stated steps with the recited materials.

The following examples explain the process of the invention in more detail.

EXAMPLE 1

50 ml of a 3 molar hydrochloric acid solution having the composition 2.0 g/l Pt, 1.8 g/l Pd, 0.5 g/l Rh, 0.8 g/l Ir, 0.05 g/l Ru, 0.05 g/l Os, 0.6 g/l Cu, 1.8 g/l Fe, 1.0 g/l Ni, 0.6 g/l Zn, 0.4 g/l Co, and 0.2 g/l Mn were adjusted to a pH of 2.5 by addition of dilute NaOH with vigorous stirring. N,N-di-n-hexyl-N'-benzoyl-thiourea (DHBT) was dissolved in xylene. The concentration was 20 g/l. The aqueous solution having a pH of 2.5 was shaken intensively 8 times, each time with 50 ml of the DHBT containing xylene solution. The temperature of the solution was 90° C.

The organic phases were collected and mixed. They contained all of the platinum group metals as well as iron and copper. The iron and copper, however, were removed by washing the organic phase with 3 molar sulfuric acid. The aqueous phase and the sulfuric acid employed for the washing were free of noble metals.

EXAMPLE 2

50 ml of 3 molar hydrochloric acid solution according to Example 1 were intensively shaken 4 times, each time for 10 minutes, with 50 ml of a thiourea containing chloroform solution produced by dissolving 20 grams of N,N-di-n-butyl-N'-benzoylthiourea (DBBT) in 1 liter of chloroform. The temperature of the solutions was 25° C. The organic phases were collected and mixed. They contained all of the palladium and traces of iron. The iron, however, was removed by washing with 3 molar sulfuric acid. Other metals were not detectable in the organic phase. The Pd content of the aqueous phase was below the limits of analytical detection.

EXAMPLE 3

50 ml of the solution of Example 1 which has been freed of Pd according to Example 2 was adjusted to a pH of 1 by the addition of dilute aqueous sodium hydroxide with vigorous stirring and intensively shaken 2 times, each time for 10 minutes, with 50 ml each time of a DBBT containing chloroform solution (20 g/l). The temperature of the solution was 25° C. The organic phases were collected and mixed. They contained all of the copper and small amounts of iron. Other metals were not detectable in the organic solution. The Cu content of the aqueous phase was below the limits of analytical detection.

EXAMPLE 4

The aqueous solution from Example 3 was adjusted to pH of 3 by addition of aqueous sodium hydroxide with stirring, heated to 60° C. and shaken intensively 6 times, each time with 50 ml of a DHBT containing toluene solution (20 g/l), in each case for 10 minutes. The organic phases were collected and mixed. They contained the entire platinum, ruthenium, and osmium, as well as a part of iron, which, however, was removed by washing the organic phase with 3 molar sulfuric acid. Other metals were not detectable in the organic solution.

EXAMPLE 5

The aqueous solution from Example 4 was intensively shaken 4 times, each time for 3 hours at 80° C., with a DHBT containing toluene solution (60 g/l). The organic phases were collected and mixed. They contained all of the rhodium and iridium and a part of the iron, which was removed by washing the organic phase with 3 molar sulfuric acid. Other metals were not detectable in the organic phase.

EXAMPLE 6

50 ml of a 3 molar hydrochloric acid aqueous solution containing 30 g/l platinum and 1.5 g/l Pd were shaken intensively 4 times, each time for 10 minutes with 50 ml of a solution of N,N-di-n-butyl-N'-benzoyl thiourea in chloroform (20 g/l), whereby the temperature of the solution was 25° C. The organic phases contained the entire palladium but no platinum, while the Pd content of the aqueous phase was below the amount detectable.

EXAMPLE 7

50 ml of a solution according to Example 6 were intensively shaken 4 times, each time for 10 minutes with 50 ml of a 25° C. warm solution of N,N-di-n-hexyl-N'-carboethoxy thiourea in chloroform (20 g/l). Here also the organic phase contained all of the palladium, the aqueous phase the platinum.

The entire disclosure of German priority application P3340055.5-24 is hereby incorporated by reference.

What is claimed is:

1. In a process for the separation and purification of the platinum group metals from base metals and for separation of the platinum group metals from each other from aqueous, acid solutions by means of an organic extraction agent in a solvent non-miscible with water, the improvement comprising employing as the extraction agent a substituted thiourea of the formula $$R_1R_2N-CS-NH-CO-R_3$$

or $$R_1R_2N-CS-NH-COOR_3$$

where $R_1$, $R_2$, and $R_3$ are substituted or unsubstituted alkyl, aryl, or aralkyl groups.

2. A process according to claim 1 wherein $R_1$, $R_2$, and $R_3$ are unsubstituted alkyl, aryl, or aralkyl group.

3. A process according to claim 2 wherein the substituted thiourea has the formula $R_1$, $R_2N-CS-NH-CO-R_3$.

4. A process according to claim 3 wherein $R_1$ and $R_2$ are lower alkyl and $R_3$ is phenyl.

5. A process according to claim 4 wherein $R_1$ and $R_2$ are alkyl of 1-6 carbon atoms.

6. A process according to claim 5 wherein $R_1$ and $R_2$ are methyl, n-butyl, or n-hexyl.

7. A process according to claim 6 where $R_1$ and $R_2$ are methyl.

8. A process according to claim 6 wherein $R_1$ and $R_2$ are n-butyl.

9. A process according to claim 6 wherein $R_1$ and $R_2$ are n-hexyl.

10. A process according to claim 2 wherein the substituted thiourea has the formula $R_1N-CS-NH-COOR_3$.

11. A process according to claim 10 wherein $R_1$, $R_2$, and $R_3$ are all lower alkyl groups.

12. A process according to claim 11 wherein $R_1$, $R_2$, and $R_3$ are alkyl of 1 to 6 carbon atoms.

13. A process according to claim 12 where $R_1$ and $R_2$ are methyl or ethyl groups.

14. A process according to claim 13 wherein the platinum group metals present include at least one member of the group consisting of Pt, Pd, Ru, Rh, Os, and Ir.

15. A process according to claim 14 wherein there is also present at least one base metal selected from the group consisting of Ag, Cu, Co, Ni, and Zn.

* * * * *